(12) United States Patent
Haas et al.

(10) Patent No.: US 8,534,467 B2
(45) Date of Patent: Sep. 17, 2013

(54) UNION COUPLING WITH REMOVABLE SCREEN

(75) Inventors: Clint R. Haas, Tucson, AZ (US); Jason A. Reichard, Vail, AZ (US)

(73) Assignee: Rain Bird Corporation, Azusa, CA (US)

( * ) Notice: Subject to any disclaimer, the term of this patent is extended or adjusted under 35 U.S.C. 154(b) by 764 days.

(21) Appl. No.: 12/622,046

(22) Filed: Nov. 19, 2009

(65) Prior Publication Data

US 2011/0114195 A1    May 19, 2011

(51) Int. Cl.
*B01D 35/02* (2006.01)

(52) U.S. Cl.
USPC ............ 210/459; 210/499; 285/336; 285/354

(58) Field of Classification Search
USPC ................ 210/459, 460, 462, 499; 285/354, 285/220, 336, 416
See application file for complete search history.

(56) References Cited

U.S. PATENT DOCUMENTS

| | | | |
|---|---|---|---|
| 306,503 A | 10/1884 | Maybury | |
| 486,692 A * | 11/1892 | Coplin | 285/62 |
| 515,788 A | 3/1894 | O'Meara | |
| 872,437 A * | 12/1907 | Leonard | 210/409 |
| 1,109,042 A * | 9/1914 | Claflin | 285/340 |
| 1,835,429 A * | 12/1931 | Rice et al. | 210/445 |
| 1,936,552 A * | 11/1933 | Goss | 285/354 |
| 1,961,498 A | 6/1934 | Krueger | |
| 1,971,120 A * | 8/1934 | Rice et al. | 210/445 |
| 2,019,094 A * | 10/1935 | Rice et al. | 210/445 |
| 2,068,858 A | 1/1937 | Jones | |
| 2,208,353 A * | 7/1940 | Woolley et al. | 285/108 |
| 2,344,698 A | 3/1944 | Howe | |
| 2,373,253 A * | 4/1945 | Martin | 285/220 |
| 2,525,652 A * | 10/1950 | Cuningham | 285/281 |
| 2,658,625 A | 11/1953 | Rafferty | |
| 2,775,350 A | 12/1956 | Jones | |
| 2,867,463 A * | 1/1959 | Snider | 277/612 |
| 3,327,858 A | 6/1967 | Eddy | |
| 3,356,255 A | 12/1967 | Zavertnik et al. | |
| 3,360,128 A | 12/1967 | Federline | |
| 3,421,631 A | 1/1969 | Hirsch | |
| 3,446,226 A | 5/1969 | Canterbury | |

(Continued)

OTHER PUBLICATIONS

Google Image Result, Union Fitting, from Petstore.com webpage titled "Union Fitting (Slip xSlip)," accessed on Aug. 3, 2009.

*Primary Examiner* — John Rivell
*Assistant Examiner* — Time Aigbe
(74) *Attorney, Agent, or Firm* — Fitch, Even, Tabin & Flannery, LLP (57) ABSTRACT

A union coupling having a removable screen is disclosed. The union coupling includes a pipe joint, a fitting that receives the screen, and a collar which clamps the fitting to the pipe joint. In one form, the fitting has an inner surface that defines a passage through the fitting and a pocket formed in the inner surface. The screen has a transverse extension that is received at least in part in the pocket with engagement of the transverse extension and pocket restricting passage of the screen past a predetermined position in the passage. A union coupling having a fitting comprising a fitting body with an outward flange and a shoulder element with an outward flange is also provided. The shoulder element is connected to the fitting body to captivate a collar between the outward flanges of the fitting so that the collar does not become separated from the fitting body. A method of assembling a union coupling is also provided.

21 Claims, 10 Drawing Sheets

(56) References Cited

U.S. PATENT DOCUMENTS

| | | | |
|---|---|---|---|
| 3,747,960 A * | 7/1973 | Bawa | 285/39 |
| 3,763,879 A | 10/1973 | Jaworek | |
| 3,957,644 A | 5/1976 | Edmonson | |
| 4,003,835 A | 1/1977 | Johnson | |
| 4,171,209 A | 10/1979 | Brown | |
| 4,253,959 A | 3/1981 | Tafara | |
| 4,286,659 A | 9/1981 | Bolding | |
| 4,442,003 A | 4/1984 | Holt | |
| 4,582,605 A * | 4/1986 | Rea et al. | 210/447 |
| 4,806,243 A * | 2/1989 | Jackson | 210/303 |
| 5,066,391 A | 11/1991 | Faria | |
| 5,076,933 A | 12/1991 | Glenn et al. | |
| 5,221,483 A | 6/1993 | Glenn et al. | |
| 5,232,015 A | 8/1993 | Heffner et al. | |
| 5,252,210 A | 10/1993 | Kessel | |
| 5,281,331 A | 1/1994 | Golan | |
| 5,284,582 A | 2/1994 | Yang | |
| 5,474,104 A | 12/1995 | Borland et al. | |
| 5,492,143 A | 2/1996 | Cooper et al. | |
| 5,503,742 A | 4/1996 | Farley | |
| 5,522,910 A | 6/1996 | Fogal | |
| 5,525,215 A | 6/1996 | Marchionda | |
| 5,545,242 A | 8/1996 | Whitlock | |
| 5,545,318 A * | 8/1996 | Richmond | 210/232 |
| 5,556,544 A | 9/1996 | Didier | |
| 5,796,035 A | 8/1998 | Walker | |
| 5,882,943 A | 3/1999 | Aldeen | |
| 5,935,434 A | 8/1999 | Cates | |
| 6,075,206 A | 6/2000 | Walker | |
| 6,116,274 A | 9/2000 | Ehrlich | |
| 6,131,608 A | 10/2000 | Lu | |
| 6,158,455 A | 12/2000 | Marshall et al. | |
| 6,346,192 B2 | 2/2002 | Buhr et al. | |
| 6,390,446 B1 | 5/2002 | Wang | |
| 6,494,325 B1 | 12/2002 | Mizrahi | |
| 6,572,029 B1 | 6/2003 | Holt | |
| 6,578,881 B2 | 6/2003 | Lynn et al. | |
| 6,605,217 B2 | 8/2003 | Buhr et al. | |
| 6,766,825 B2 * | 7/2004 | Antunez | 137/549 |
| 6,830,062 B2 | 12/2004 | Montpetit | |
| 6,860,526 B2 * | 3/2005 | Miyahara et al. | 285/416 |
| 6,938,437 B2 | 9/2005 | Velez et al. | |
| 7,143,898 B1 | 12/2006 | Hoaglin | |
| 7,309,113 B2 | 12/2007 | Carter | |
| 7,665,713 B1 | 2/2010 | Clark | |
| 7,810,851 B2 | 10/2010 | Wangsgaard | |
| 2001/0037975 A1 | 11/2001 | Buhr et al. | |
| 2003/0080563 A1 | 5/2003 | Roberts et al. | |
| 2004/0256303 A1 | 12/2004 | Talbot et al. | |
| 2005/0121383 A1 | 6/2005 | Honda et al. | |
| 2005/0230650 A1 | 10/2005 | Peterson | |
| 2006/0151376 A1 | 7/2006 | Tubbs et al. | |
| 2008/0073261 A1 | 3/2008 | Schwab et al. | |
| 2008/0237112 A1 | 10/2008 | Ford et al. | |
| 2011/0304137 A1 | 12/2011 | Ericksen et al. | |

\* cited by examiner

UNION COUPLING WITH REMOVABLE SCREEN

FIELD

The field relates to pipe couplings used in irrigation and, more particularly, to pipe couplings having removable screens.

BACKGROUND

Irrigation systems utilize a series of pipes or conduits for conveying water from a water source to a series or network of water emitters or sprinklers. Irrigation system components are typically installed and operate below ground level, which may cause rocks, dirt, and other debris to enter the irrigation system and travel along the pipes with the water flow. Contamination, particularly in the form of particulate matter, can impair the operation of components within the irrigation system. To protect a component, such as a valve, from particulate matter, some irrigation systems utilize a screen disposed at the inlet of the valve. However, a valve using such an approach suffers from a significant shortcoming in that a user must disconnect the valve from the upstream and downstream pipe in order to service the valve. Commonly, the pipes are threadingly engaged with the valve and must be rotated to disconnect the pipe from the valve. This operation may be difficult and time consuming if the valve and the upstream pipe are in narrow confines or are otherwise limited in their range of movement.

One approach to creating a more easily serviceable connection between a pipe and a valve is to use a union coupling. A union coupling has a pair of fittings or joints that may connect to other irrigation system components, such as the pipe and the valve. The union coupling further comprises a collar that is rotated or otherwise manipulated to draw the fittings together and form a connection therebetween. One type of existing union coupling includes a fitting having an annular ridge extending around one end of the fitting to restrict the collar from sliding off of the fitting. However, the collar is free to slide off the other end of the fitting until that end is connected to the pipe or valve. This approach may be problematic during installation, as the fitting with the annular ridge can be accidently installed onto the pipe or valve without the collar. If pipe cement or other chemical bonding has been used, subsequent removal of the fitting from the pipe or valve may cause damage to the fitting and require replacement.

Another shortcoming of existing union couplings is that they are often unable to withstand loads applied to the side of the manifold. In greater detail, these types of manifolds have an annular ridge to retain a collar on each outlet of the manifold with the collars being used to connect the respective outlet to a fitting or hose. Irrigation manifolds are assembled by passing a collar of the union coupling over the outlet and urging an inwardly projecting lip of the collar against the annular ridge of the manifold until it is forced beyond the ridge. Once the lip has been forced past the annular ridge, the interference between the lip and the annular ridge restricts the collar from falling off the manifold outlet. Because the annular ridge has to be small enough to permit the lip of the collar to snap beyond the annular ridge, the ability of the ridge to restrict the collar from falling off of the outlet is necessarily less than optimal. Accordingly, when a side load is applied to the manifold, the resulting bending moment between a manifold outlet and the corresponding fitting tends to cause the collar to snap past the annular ridge and off of the manifold outlet.

Yet another disadvantage of existing union couplings is manifest in typical plumbing installations using polyvinyl chloride (PVC) pipes. Specifically, one common approach to installing a union coupling with PVC pipes involves using a series of fittings interconnected by short pieces of pipe. For example, if a PVC pipe is to be connected to a valve, an installer would use: 1) a slip fitting for connecting to the end of the PVC pipe; 2) a union coupling including two fittings and a collar; 3) a male threaded adapter for connecting to the valve inlet; 4) a short piece of PVC pipe to connect the slip fitting to the union coupling; and 5) a short piece of PVC pipe to connect the union coupling to the male threaded adapter. Although the series of fittings and PVC pipes would be relatively rigid once connected, the overall size of the installation is very large and labor-intensive to assemble. Further, it is problematic to keep all of the fittings and PVC piping on hand for what is essentially a custom installation for each valve.

DETAILED DESCRIPTION OF THE PREFERRED EMBODIMENTS

A union coupling with a removable screen is provided that retains the screen in a user-serviceable portion of the coupling such that a user may readily access, clean, or replace the screen. The union coupling may be installed at any location within an irrigation system, though the union coupling is particularly well-suited for installation between a pipe and a valve or between two pipes. By one approach, the union coupling comprises a pipe joint, a collar, and a fitting, wherein the collar is configured to clamp the fitting to the pipe joint. The fitting has an inner surface that defines a passage and has a pocket formed in the inner surface.

The fitting has an opening at one end thereof that opens into the passage and is sized to accept at least a portion of a screen. Specifically, the screen has a downstream portion that is inserted through the opening of the fitting and into the passage. The screen also has an upstream portion with a transverse extension, wherein the transverse extension is received in the pocket of the fitting. In this way, the engagement between the transverse extension of the screen and the pocket of the fitting restricts passage of the upstream portion of the screen beyond a predetermined position in the passage. This configuration permits a user to easily remove the screen from the fitting for cleaning by simply disconnecting one end of the fitting from the pipe joint and the other end of the fitting from the valve or pipe. In one form, the transverse extension of the screen comprises a tip portion that is received in the pocket, and a thin gripping portion that a user may conveniently grip to remove the screen from the fitting. Further, the engagement between the transverse extension and the pocket requires the screen to be installed in the fitting in a particular orientation which ensures that the screen is properly installed within the union coupling.

In another respect, the union coupling comprises a pipe joint, a collar, and a fitting comprising a fitting body and a shoulder element. The fitting body has a first end that is configured to connect to the pipe joint. To assemble the union coupling, the collar is passed over the first end of the fitting body. The shoulder element is then connected to the fitting body which captivates the collar on the fitting body. With the shoulder element connected to the first end of the fitting body, the fitting body and the shoulder element have outward flange portions that restrain an inward flange of the collar therebetween. Further, connecting the shoulder element to the fitting body after the collar has passed over the first end of the fitting body permits the outward flange portion of the shoulder element to be made sufficiently large to restrict movement of the collar. In contrast to prior irrigation manifolds, the outward flange portion of the shoulder element may be larger than the traditional annular ridge because the inward flange portion of the collar does not need to snap past the outward flange portion of the shoulder element. Further, a larger shoulder element also has a larger bearing surface for engaging a sealing surface of the pipe joint which permits a more stable interface between the fitting and the pipe joint than conventional union couplings. As is apparent, this approach resists pulling apart of the fitting and pipe joint such that the union coupling may better resist side loading than traditional configurations.

By another approach, the union coupling has a fitting with an inner surface that defines a passage through the fitting. The fitting has a recessed support formed in the inner surface and at least one stop that extends from the inner surface and is spaced from the recessed support along the length of the fitting. The recessed support extends transversely to the length of the fitting and outwardly from the inner surface thereof. A screen is received within the fitting and includes an upstream end with a transverse extension that seats against the recessed support. Further, a downstream end of the screen includes a rim that rests against the stop. This way, the recessed support and the stop brace the screen against the flow of the water debris within the water flow. In one form, the rim of the screen has a continuous outer surface that is flush with the inner surface of the fitting when the screen is received within the fitting. The close fit between the rim of the screen and the inner surface of the fitting resists the passage of waterborne particles beyond the screen. Additionally, removing the screen from the fitting causes the screen rim to slide along the inner surface of the fitting and pull debris deposited on the inner surface of the fitting out of the fitting.

Figure 1:
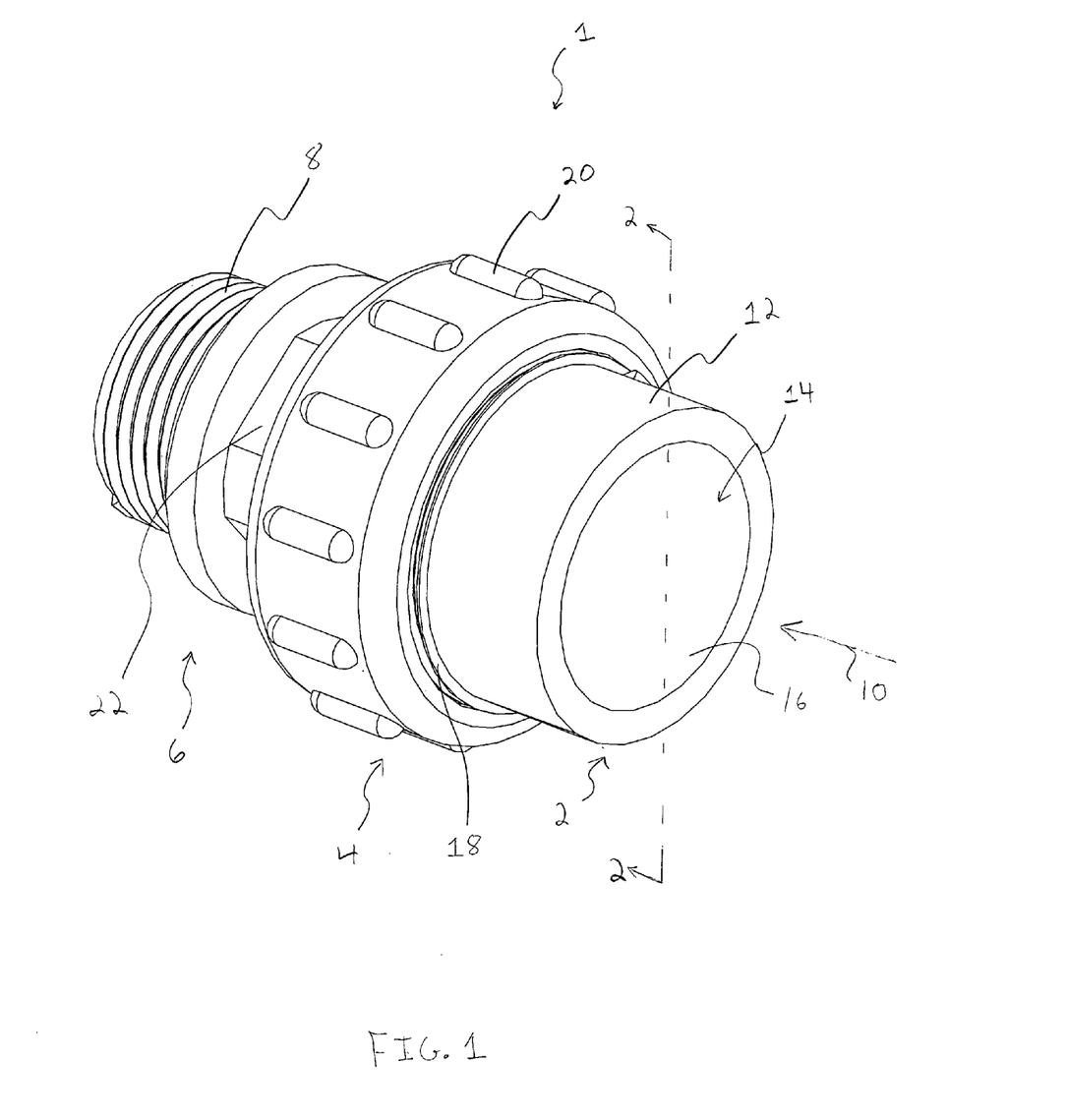
FIG. 1 is a perspective view of a union coupling.

Turning to the figures, FIGS. 1-9 illustrate an embodiment of a union coupling 1 comprising a pipe joint 2, a collar 4, and a fitting 6. The coupling 1 may be installed between lengths of pipe, as well as between a pipe and a valve. As shown in FIG. 1, the fitting 6 has a threaded portion 8 that is connected to the inlet of a valve (not shown). This way, water will flow in the direction of arrow 10 into the pipe joint 2 through the fitting 6 and eventually into the valve. The pipe joint 2 has a wall 12 that defines a passage 14 for receiving an end of a pipe (not shown) and an inner surface 16 configured to fit snugly with the end of the pipe. The pipe joint 2 also has a threaded portion 18 at the end of the pipe joint 2 adjacent the fitting 6. The threaded portion 18 of the pipe joint 2 is configured to interface with threads (see FIG. 2) on an interior surface of the collar 4. The engagement of the threads of the collar 4 with the threaded portion 18 of the pipe joint 2 is configured such that rotating the collar 4 draws the fitting 6 and the pipe joint 2 into abutting relation and clamps the fitting 6 against the pipe joint 2. To improve the ease of installation of the union coupling 1, the collar 4 may include protuberances 20 positioned around the circumference of the collar 4 that assist with manual manipulation of the collar 4. Additionally, the fitting 6 may include flat surfaces 22 that are arranged around the circumference of the fitting 6 and interface with a wrench so that fitting 6 may be firmly connected to the downstream valve or pipe.

Figure 2:
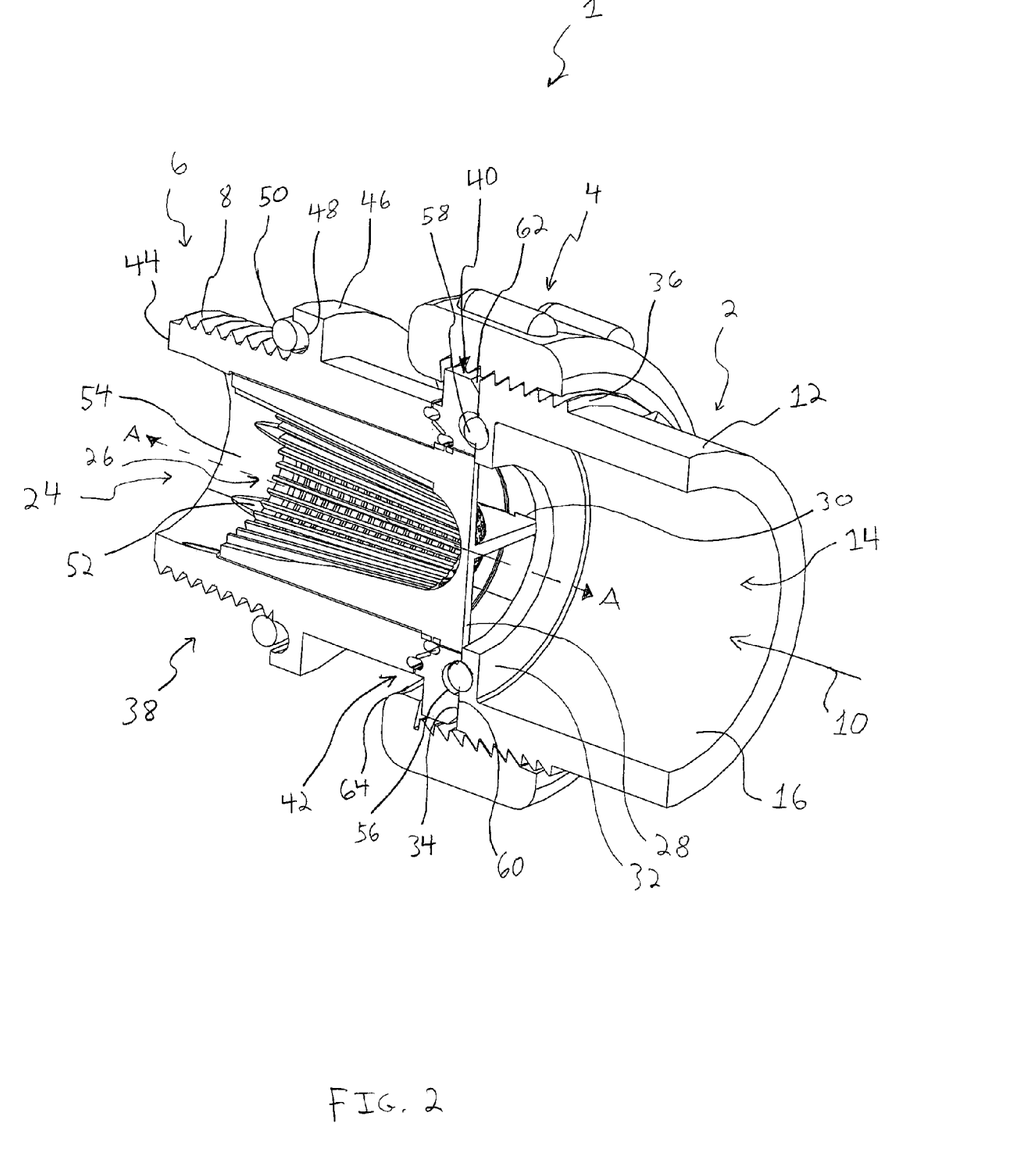
FIG. 2 is a cross-sectional perspective view of the union coupling of FIG. 1 taken across line 2-2 in FIG. 1.

As shown in FIG. 2, the fitting 6 includes a passage 24 that is aligned with the passage 14 in the pipe joint 2 when the pipe joint 2 is connected to the fitting 6 via the collar 4. A screen 26 is positioned within the fitting 6 and in the path of water flow shown by direction arrow 10. As will be discussed in greater detail below, the screen 26 includes fins or transverse extensions 28 that are each held within a recess or pocket 30 by the compression of an annular wall 32 of the pipe joint 2. In one approach, the screen 26 is inserted into the fitting 6 and the annular wall 32 of the pipe joint 2 is pressed against an upstream facing surface 34 of the fitting 6 before the collar 4 is rotatably engaged onto male threads 36 located on the pipe joint 2. The fitting 6 may have a two-part construction comprising a fitting body 38 and a shoulder element 40 that are connected at a fixed joint 42, preferably by a frictional spin weld. In one approach, the spin weld is produced by pressing the shoulder element 40 against the fitting body 38 and rotating the shoulder element 40 until the friction therebetween generates localized heating. Once the heating reaches a sufficient temperature, the materials of the shoulder element 40 and the fitting body 38 melt together. The rotation is stopped and the fitting 6 is allowed to cool. Alternatively, the shoulder element 40 may be connected to the fitting body 38 via a chemical weld or mechanical means, such as fasteners which tightly clamp the shoulder element 40 to the fitting body 38.

In one form, the fitting body 38 has an annular wall 44 that partially defines the passage 24. The wall 44 includes an outward flange 46 that projects radially outward from the wall 44. The outward flange 46 defines an annular recess 48 that faces downstream and is configured to receive a seal or o-ring 50. The o-ring 50 provides a water tight seal with the inlet of the valve. The fitting body 38 also includes an inwardly directed flange or stop flange 52 that is spaced from the pockets 30 of the fitting 6 along the length of the fitting 6. The stop flange 52 projects radially inward from the inner surface 54 of the fitting 6. In the embodiment shown, the flange 52 comprises a plurality of ledges or stops having surfaces which face upstream and abut an end of the screen 26 to brace the screen 26 against the flow of water and debris. The stops are shown as being integrally formed with the fitting body 38, though they may be separate structures that are connected to the fitting body 38. Alternatively, the stop flange 52 may be a continuous radially projecting element to support the screen 26.

The upstream facing surface 34 of the fitting 6 defines a recess 56 configured to receive an o-ring 58. The o-ring 58 forms a water-tight seal between the surface 34 of the fitting 6 and a downstream facing end surface 60 of the pipe joint 2. Rotation of the collar 4 when threaded onto the male threads 36 of the pipe joint 2 tends to compress the o-ring 58 between the surfaces 34, 60 which enhances the water-tight seal. The shoulder element 40 also includes an outward flange 62 that extends radially outward from the fitting 6. The outward flange 62 of the shoulder element 40 and the outward flange 46 of the fitting body 38 restrain movement of an inward flange 64 of the collar 4 along the fitting 6. With the inward flange 64 of the collar 4 between the outward flanges 46, 62, the collar 4 is captivated on the fitting 6 such that the collar 4 may only translate along the length of the fitting 6 between the flanges 46, 62. Further, the collar 4 may freely rotate about a longitudinal axis of the fitting 6, as represented by line A-A in FIG. 2.

Figure 3:
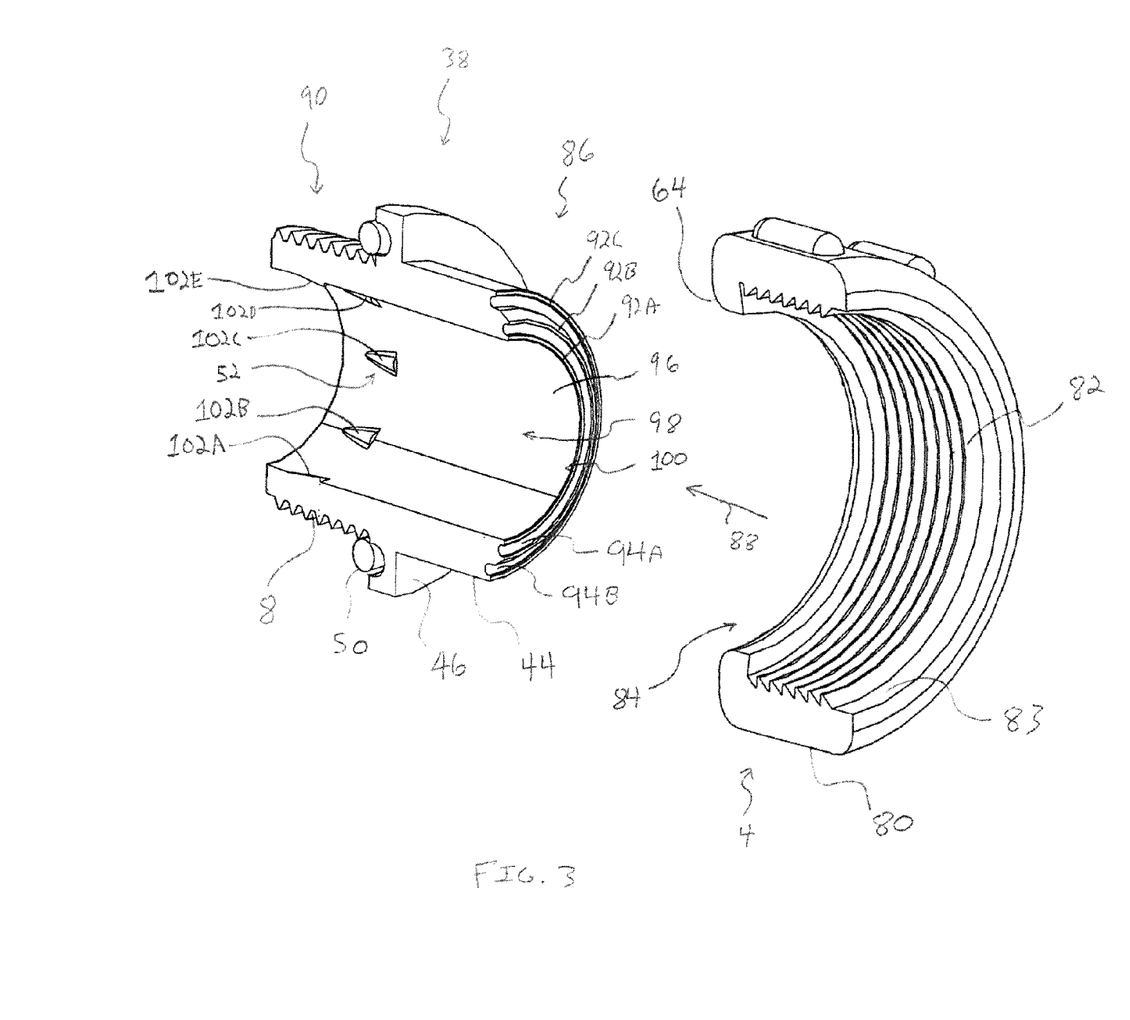
FIG. 3 is a cross-sectional perspective view of a fitting body and a collar of the union coupling of FIG. 2.

With reference to FIGS. 3-7, there is illustrated one approach to assembling the coupling 1. Specifically, FIG. 3 shows the collar 4 being positioned on the fitting body 38 before the shoulder element 40 is connected to the fitting body 38. The collar 4 has a wall 80 that includes female threads 82 on an inner surface 83 thereof which are configured to engage the male threads 36 on the pipe joint 2. The inward flange 64 of the collar 4 defines an opening 84 that is sized to pass over a first end 86 of the fitting body 38 in direction 88. Because the shoulder element 40 is not yet attached to the fitting body 38, the collar 4 is free to be removed from the first end 86 of the fitting body 38. Opposite the first end 86 of the fitting body 38 is a second end 90 that includes the threaded portion 8. The outward flange 46 is positioned intermediate the first end 86 and the second end 90 of the fitting body 38. The outward flange 46 resists movement of the inward flange 64 of the collar 4 along the fitting body 38 toward the second end 90 of the fitting body 38.

The first end 86 of the fitting body 38 is configured to connect to the shoulder element 40. Specifically, FIG. 3 illustrates a series of concentric, annular lips 92A-92C disposed at the first end 86 of fitting body 38 and grooves 94A and 94B concentrically disposed between the lips 94A-94C. In one embodiment, the shoulder element 40 is connected to the fitting body 38 via a spin weld. The spin welding process deforms lips 92A-92C and welds the lips 92A-92C to adjacent structures of the shoulder element 40. FIG. 3 also illustrates an inner surface 96 of the fitting body 38 that defines a passage 98 extending along the length of the fitting body 38. An opening 100 opens into the passage 98 at the first end 86 of the fitting body 38, while at the second end 90, the stop flange 52 projects radially inward from the inner surface 96. As shown, the stop flange 52 comprises a series of equally spaced ledges or stops 102A-102E extending radially inward from the inner surface 96.

Figure 4:
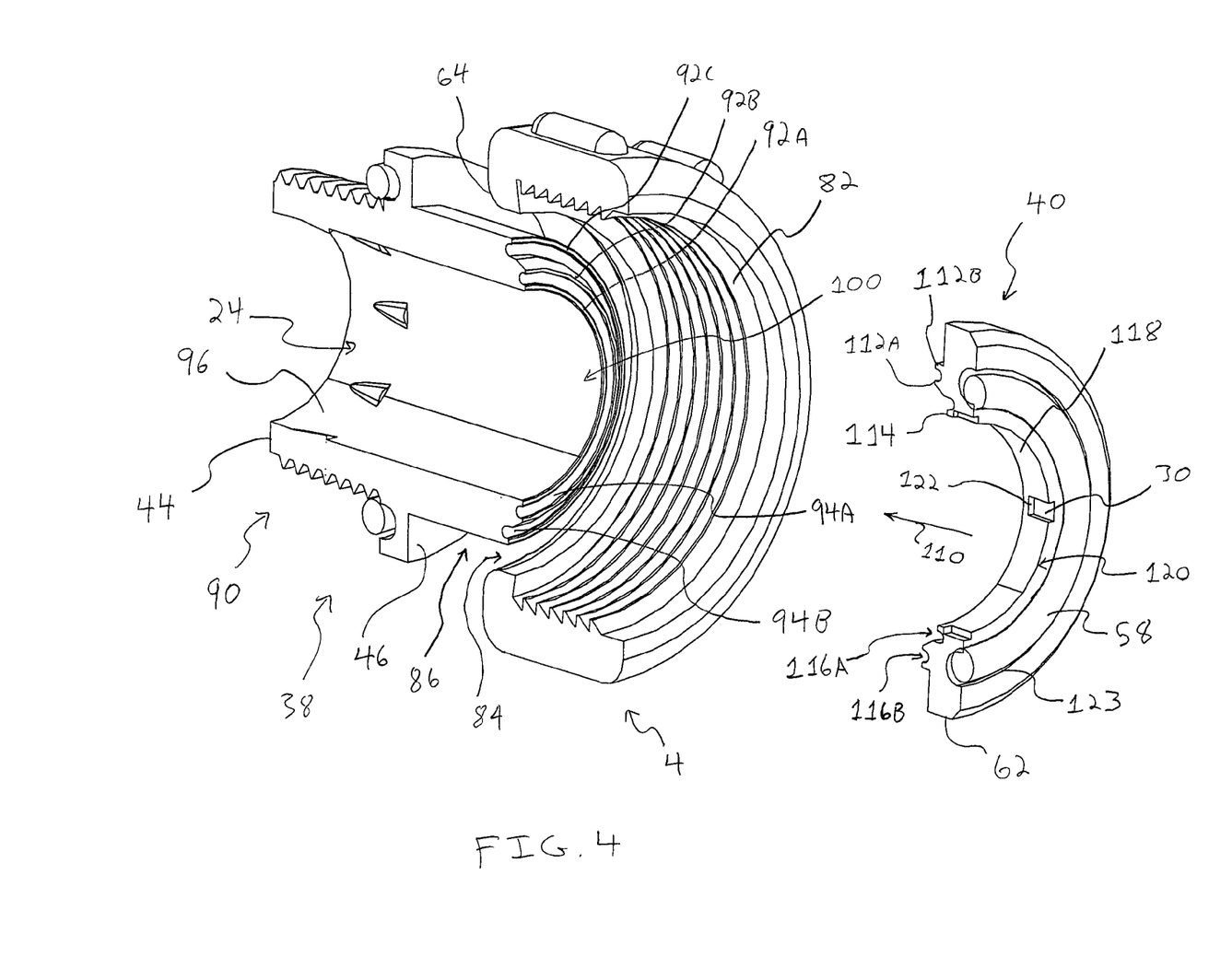
FIG. 4 is a cross-sectional perspective view of the fitting body and the collar of FIG. 3 in conjunction with a shoulder element of the union coupling.

Once the opening 84 of the collar 4 has passed over one first end 86 of the fitting body 38, the shoulder element 40 may be connected to the fitting body 38 in direction 110, as shown in FIG. 4. The shoulder element 40 has concentric, annular lips 112A and 112B configured to mate with lips 92B and 92C, respectively, of the fitting body 38, while radially inner neck 114 mates with the lip 92A. Adjacent the lips 112A, 112B of the shoulder element 40 are concentrically disposed grooves 116A and 116B, the grooves 116A, 116B being aligned with grooves 94A and 94B, respectively, of the fitting body 38 when the shoulder element 40 is connected to the fitting body 38. The grooves 116, 94 form annular pockets 117A, 117B that extend around the wall 44 of the fitting body 38 at the first end 86 (see FIG. 6). In one form, the pockets 117A, 117B defined by the grooves 94, 116 permit the lips 92, 112, and neck 114 to deform during the spin welding process.

Returning to FIG. 4, the shoulder element 40 includes a radially inner surface 118 that defines an opening 120. With the shoulder element 40 connected to the fitting body 38, the opening 120 of the shoulder element 40 is aligned with the opening 100 of the fitting body 38 such that the radially inner surface 118 of the shoulder element 40 is flush with the inner surface 96 of the fitting body 38. In this way, the screen 26 may be inserted into the passage 24 of the fitting 6 without snagging on the radially inner surface 118 of the shoulder element 40 or the inner surface 96 of the fitting body 38. The shoulder element 40 may also include a series of pockets 30 disposed evenly around the radially inner surface 118. Each pocket 30 includes a recessed support or seating surface 122 that extends perpendicularly to the inner surface 118 of the shoulder element 40. The seating surface 122 is configured to restrict movement of the transverse extensions 28 of the screen 26 from traveling toward the second end 90 of the fitting body 38. Alternative embodiments of the seating surface 122 may include a variety of configurations for the seating surface 122. For example, the seating surface 122 may be inclined at an angle relative to the inner surface 118 of the shoulder element 40. The shoulder element 40 also may include an annular channel 123 that extends around the shoulder element 40 and receives the o-ring 58. The o-ring 58 is configured to form a water-tight connection with the annular wall 32 of the pipe joint 2 when the coupling 1 is fully assembled.

Figure 5:
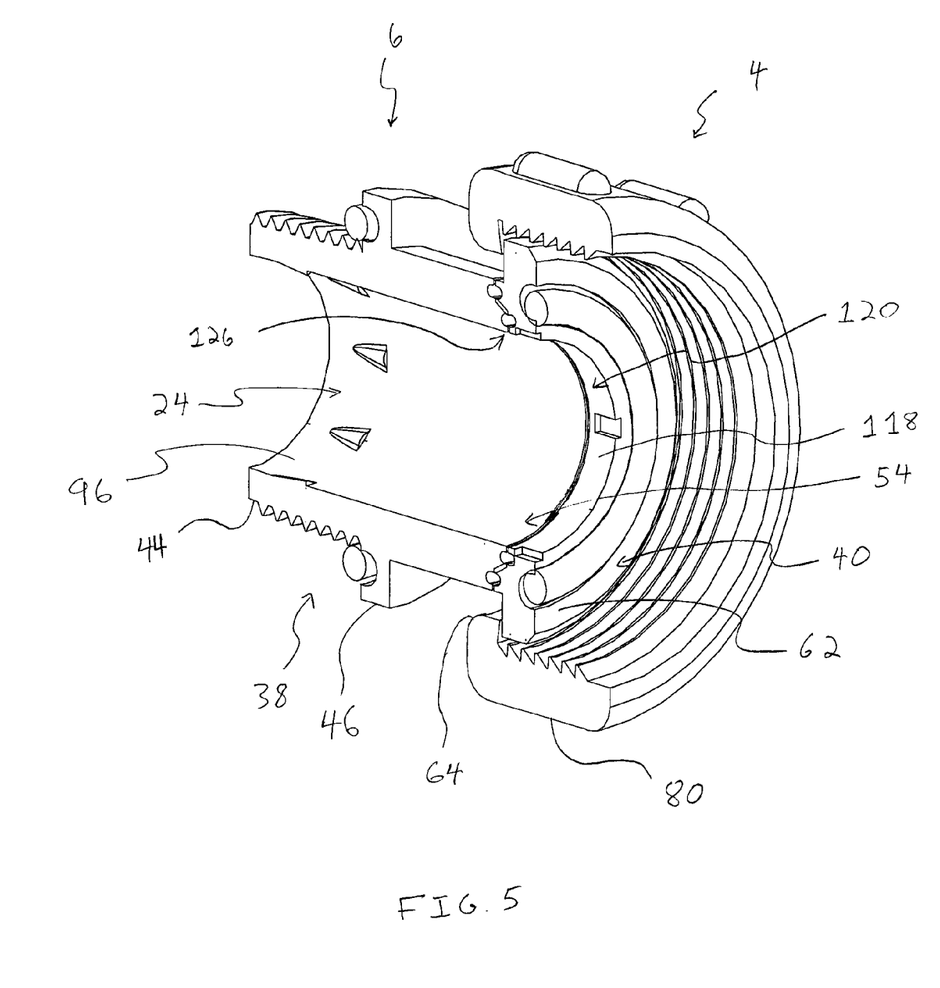
FIG. 5 is a cross-sectional perspective view similar to FIG. 4 with the shoulder element connected to the fitting body.

In FIG. 5, the shoulder element 40 is connected to the fitting body 38 to form the fitting 6. The inward flange 64 of the collar 4 is captured between the outward flange 46 of the fitting body 38 and the outward flange 62 of the shoulder element 40. In this configuration, the outward flange 46 and the outward flange 62 are in overlapping relation with the inward flange 64 of the collar 4 along the longitudinal axis of the fitting 6. An interface 126 of the fitting 6 provides a smooth transition between the inner surface 118 of the shoulder element 40 and the inner surface 96 of the screen body 38. In this way, the inner surface 54 of the fitting 6 defines a passage 24 for receiving the screen 26.

Figure 6:
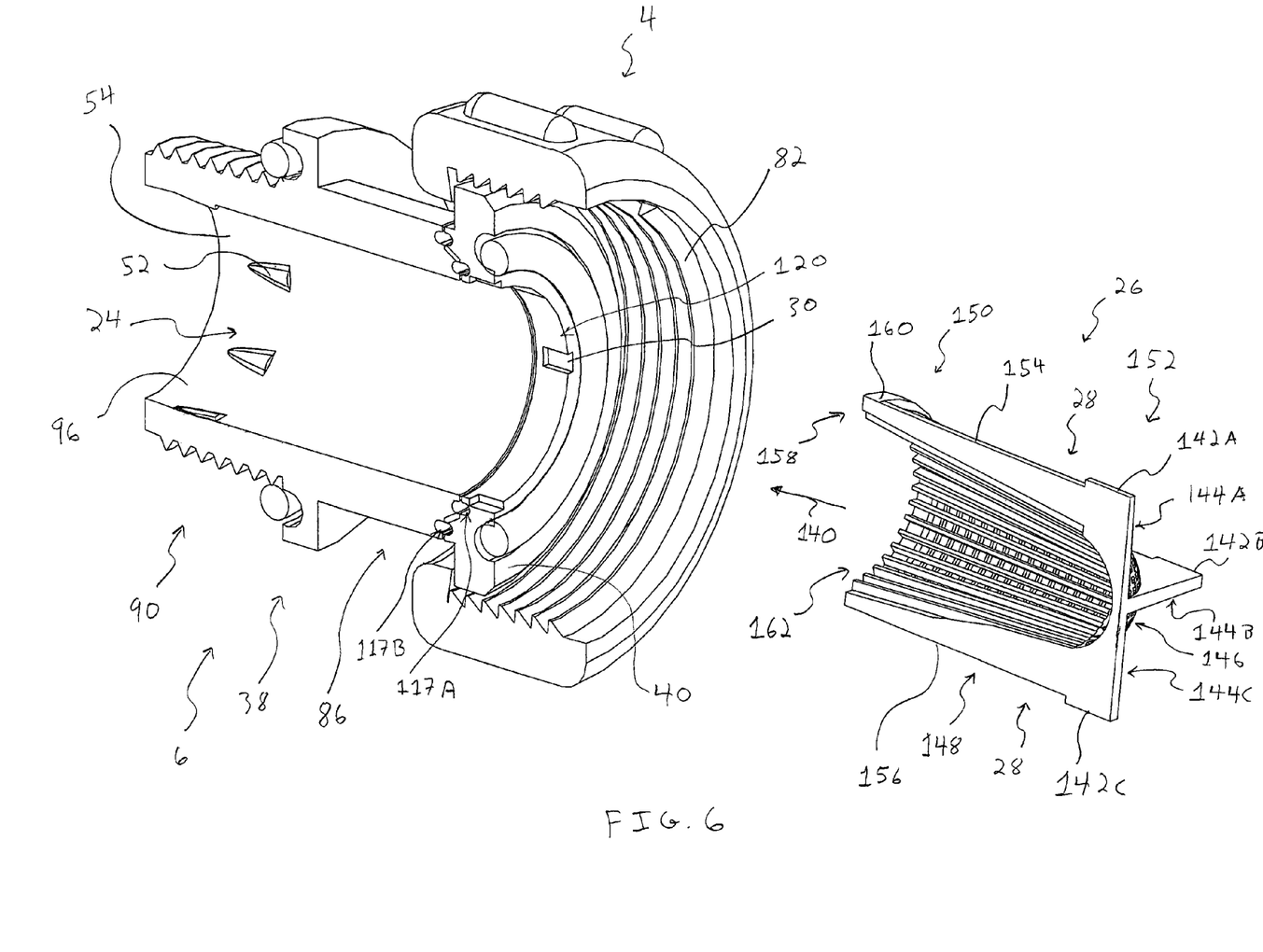
FIG. 6 is a cross-sectional perspective view of the fitting body, shoulder element, and collar of FIG. 5, in conjunction with a screen of the union coupling.

As shown in FIG. 6, once the shoulder element 40 has been connected to the fitting body 38, the fitting 6 and the collar 4 are effectively a single piece that may be handled and installed onto a valve or pipe without the collar 4 falling off or being incorrectly installed. With the shoulder element 40 connected to the fitting body 38, the opening 120 of the shoulder element 40 opens into the passage 24 of the fitting 6 such that the screen 26 may be inserted in direction 140 into the passage 24 of the fitting 6. The screen 26 has one or more transverse extensions 28 that each include a tip 142 at the outermost portion of the transverse extension 28 and a gripping portion 144 that extends from a mid point 146 of the screen 26 to the tip 142. The gripping portion 144 is relatively thin and permits a user to grab the gripping portion 144 between the user's thumb and index finger or with a tool, such as a pair of pliers.

Each transverse extension 28 also includes a rib 148 that extends between a downstream end 150 of the screen 26 and an upstream end 152 of the screen 26. In the illustrated embodiment, the transverse extensions 28 are organized in a cross configuration so that one pair of transverse extensions 28 lies along a plane that is perpendicular to a plane defined by the other pair of transverse extensions 28. The transverse extensions 28 extend outward beyond an outer profile or outer surface 160 of the screen which permits the screen 26 to be clamped between the pipe joint 2 and the fitting 6. Further, a pair of outermost surfaces 154 and 156 defines a distance that is less than the distance between tip 142A and tip 142C.

The narrower portions of the screen 26 permit the downstream end 150 of the screen 26 to be inserted into the passage 24 with the outermost surfaces 154, 156 abutting the inner surface 96 of the fitting body 38. Conversely, the tips 142 extend outward beyond an outer surface 160 of the screen 26 which prevents over-insertion of the screen 26 in the passage 24 in direction 140. Specifically, the engagement of the tips 142 in the pockets 30 restricts movement of the screen 26 and, in combination with the stop flange 52, braces the screen 26 against the water flow and debris suspended in the water that may impact against the screen 26 and force the screen 26 toward the second end 90 of the fitting body 38.

At the downstream end 150, the screen 26 has a seating rim 158 that seats against the stop flange 52 and has a shape that is similar to the contour of the inner surface 96 of the fitting body 38, as shown in FIG. 6. In this manner, the outer surface 160 is complimentary with the inner surface 96 of the fitting body 38. The outer surface 160 is continuous about the rim 158 so that when the screen 26 is installed within the fitting 6, debris traveling in direction 140 toward the screen 26 will be trapped upstream of the rim 158 and unable to pass beyond the rim 158. The outer surface 160, however, may also be discontinuous about the rim 158 while still restricting debris from passing beyond the screen 26. For example, the rim 158 may include a slot formed in the outer surface 160 that is configured to engage a raised feature on the inner surface 54 of the fitting 6.

The components of the coupling 1 may have a cross-sectional configuration other than the substantially circular embodiment shown in FIG. 1. For example, if the fitting 6 has a rectangular cross section, then the rim 158 of the associated screen 26 may also be rectangular so that the rim 158 will abut the inner surface 96 of the fitting body 38. Like the fitting 6 and the screen 26, the screen element 162 may take other shapes, such as cubic or cylindrical, as appropriate for a desired application. In the embodiment of FIG. 6, the screen 26 has a frusto-conical screen element 162 that is wider at the downstream end 150 and narrower at the upstream end 152. This configuration tends to direct debris toward downstream end 150 of the screen 26 where the debris accumulates adjacent the rim 158 and the inner surface 96 of the fitting body 38. By directing the debris downstream, the upstream end 152 of the screen element 162 tends to remain unblocked during operation, which improves fluid flow through the coupling 1.

Figure 7:
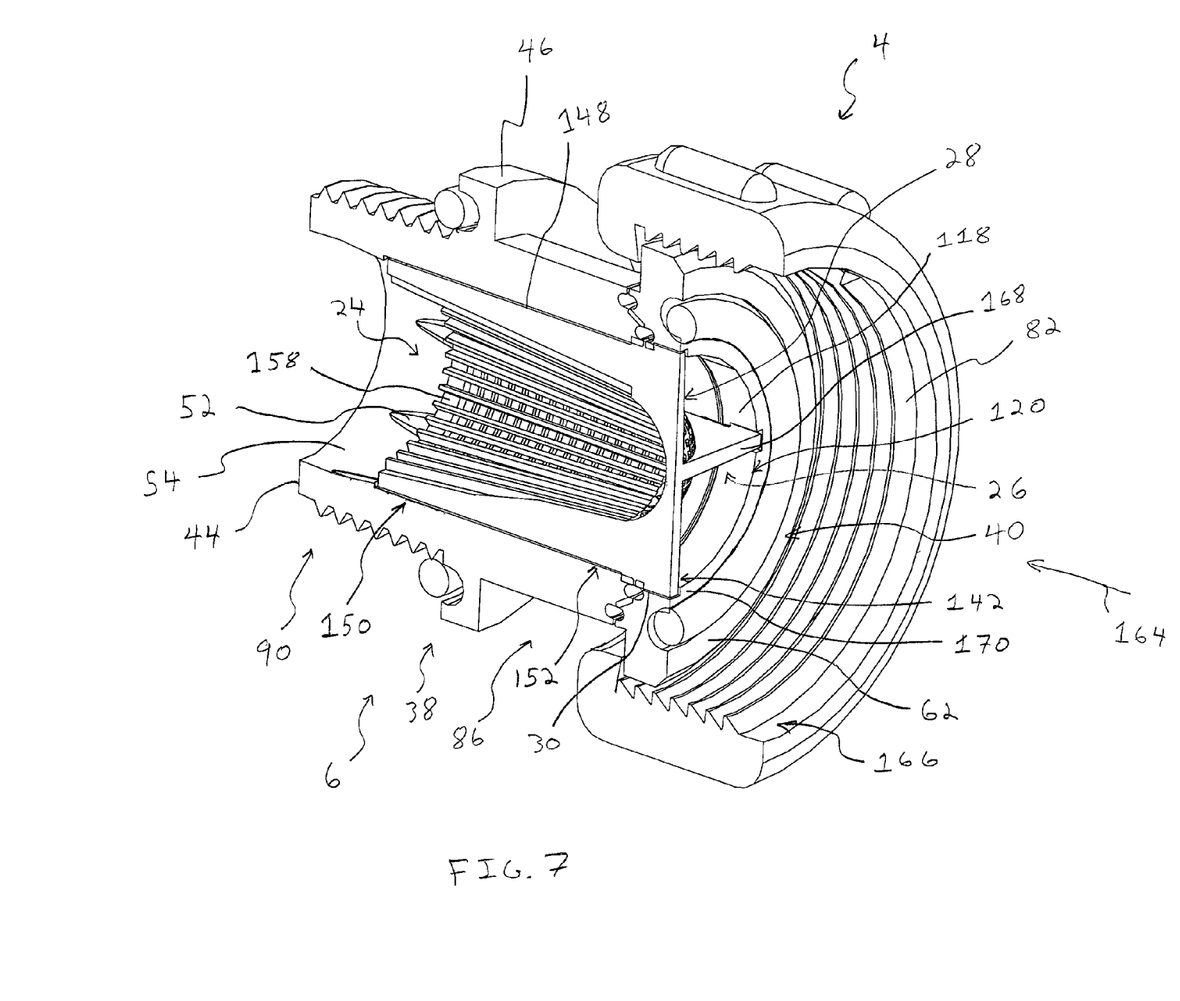
FIG. 7 is a cross-sectional perspective view similar to FIG. 6 with the screen installed within the fitting body and the shoulder element.

Turning to FIG. 7, the screen 26 is shown having been installed in direction 164 into the fitting 6. The downstream end 150 of the screen 26 is inserted through an opening 166 formed by the collar 4 and into the opening 120 of the shoulder element 40. With the screen 26 received within the fitting 6, the ribs 148 are in close relation with the inner surface 54 of the fitting 6, which limits movement of the screen 26 in directions that are transverse to the longitudinal axis of the fitting body 38. The rim 158 abuts the stop flange 52, which restricts movement of the screen 26 toward the second end 90 of the fitting body 38. At the upstream end 152 of the screen 26, there is an upstream surface 168 that is level with or slightly down stream of an adjacent, annular surface 170 of the shoulder element 40. The surface 170 extends radially outward from the opening 120 of the shoulder element 40 and along the outward flange 62 to form an interface with the sealing surface 60 of the pipe joint 2. By positioning the upstream surface 168 of the screen 26 level with or slightly downstream of the surface 170 of the shoulder element 40, a water tight seal may be formed between the surface 170 and the sealing surface 60 of pipe joint 2 when the collar 4 connects the fitting 6 to the pipe joint 2. As shown in FIG. 7, the fitting 6, collar 4, and screen 26 are ready to be connected to the pipe joint 2.

Figure 8:
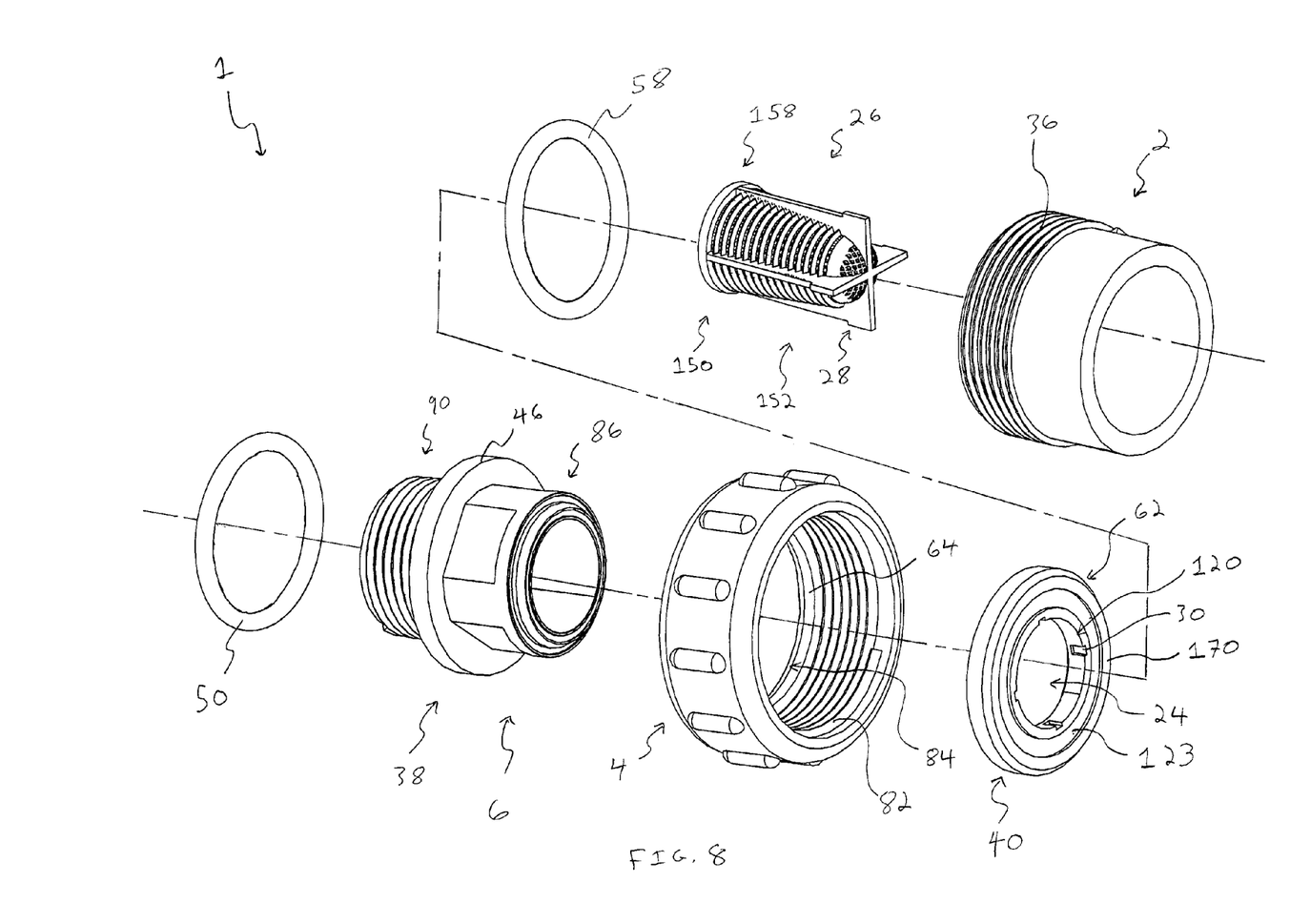
FIG. 8 is an exploded perspective view of the union coupling of FIG. 1.

With reference to FIG. 8, the o-ring 50 is received within an annular recess in the outward flange 46 on the fitting body 38. Then, the opening 84 of the collar 4 is aligned with and passed over the first end 86 of the fitting body 38 before the shoulder element 40 is affixed to the first end 86 of the fitting body 38. By connecting the shoulder element 40 to the fitting body 38, the fitting 6 is formed and the collar 4 is captivated thereon. Specifically, the inward flange 64 of the collar 4 is positioned in overlapping relation with the outward flanges 46, 62 along the longitudinal axis of the fitting 6. FIG. 8 also shows the plurality of pockets 30 that extend from the opening 120 of the shoulder element 40 longitudinally along the fitting 6. The shoulder element 40 includes the annular channel 123, which receives the o-ring 58. The o-ring 58 provides a water tight seal between the fitting 6 and the pipe joint 2.

Once the o-ring 58 has been installed in the channel 123 of the shoulder element 40, the screen 26 may be installed into the passage 24 defined by the fitting 6. The transverse extensions 28 of the screen 26 are aligned with the pockets 30 before the downstream end 150 of the screen 26 is inserted into the passage 24, with continued insertion of the screen 26 engaging the transverse extensions 28 within the pockets 30. As the transverse extensions 28 engage the pockets 30, the rim 158 of the screen 26 seats against the stop flange 52 of the fitting 6. With the screen 26 received within the fitting 6, the pipe joint 2 is ready to be connected to the fitting 6 via rotation of the collar 4 which engages the female threads 82 of the collar 4 with the male treads 36 of the pipe joint 2. Continued rotation of the collar 4 draws the inward flange 64 of the collar against the outward flange 62 of the shoulder element 40 which, in turn, draws the confronting surface 170 of the shoulder element 40 against the pipe joint 2 to securely fasten the fitting 6 to the pipe joint 2. This rigidly locks the transverse extensions 28 of the screen 26 within the pockets 30 formed in the shoulder element 40. Additionally, the engagement of the fitting 6 against the pipe joint 2 presses the rim 158 of the screen 26 against the stop flange 52 of the fitting body 38. In this form, the union coupling 1 is assembled into an interconnected assembly that is ready to be transported or installed as desired.

Figure 9:
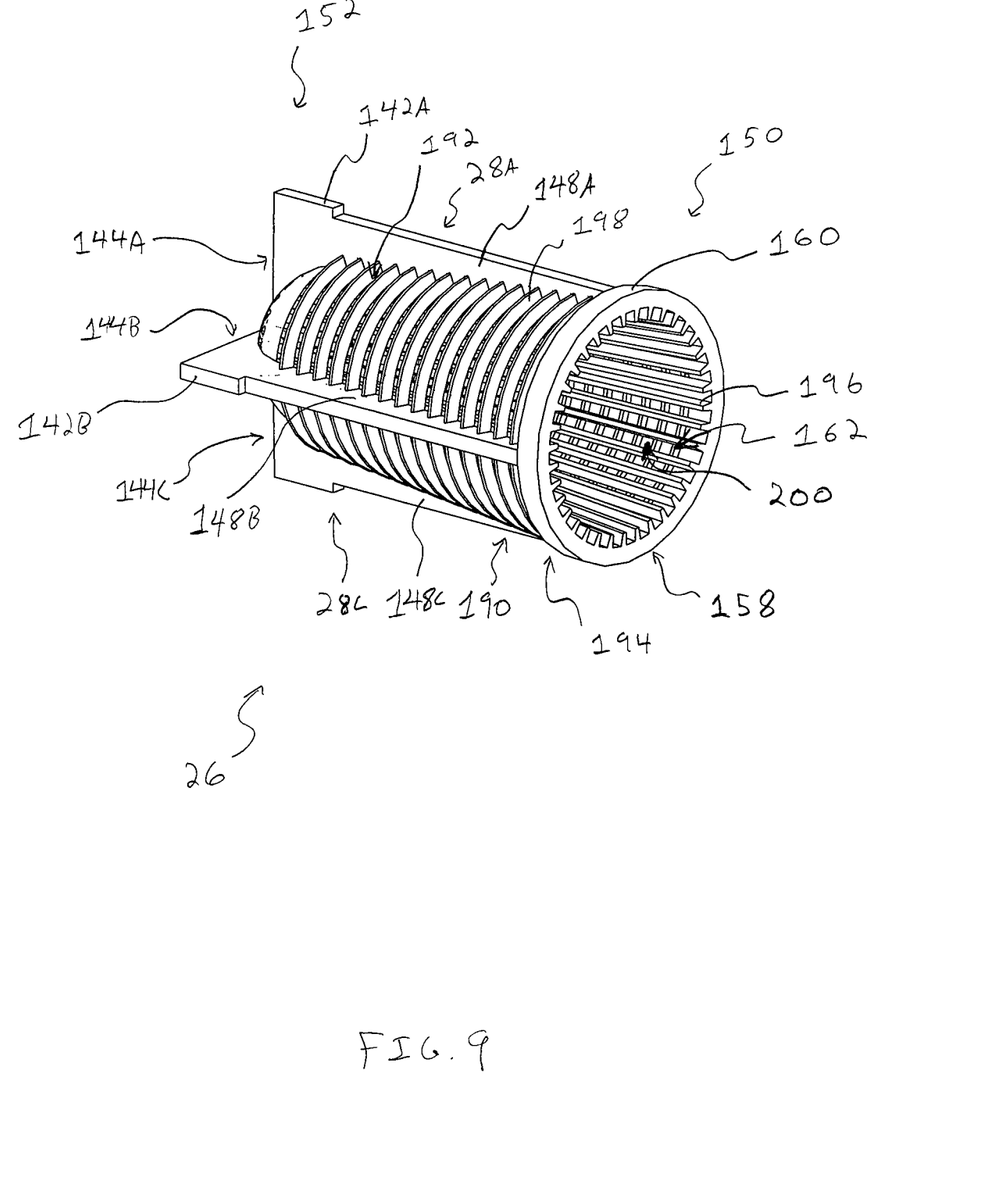
FIG. 9 is a perspective view of the screen of the union coupling of FIG. 8.

With reference to FIG. 9, the screen element 162 forms a juncture 194 with the outer surface 160 of the rim 158. This configuration tends to accumulate debris at the juncture 194 and restricts passage of the debris beyond the rim 158 of the screen 26. A wider end 190 of the screen element 162 is positioned adjacent the juncture 194, while a narrower end 192 of the screen element 162 is positioned adjacent the upstream end 152. The screen element 162 includes longitudinal members 196 and arcuate lateral member 198, wherein the longitudinal members 196 extend from the downstream end 150 of the screen 26 to the upstream end 152. Conversely, the lateral numbers 198 extend around the circumference of the frusto-conical screen element 162 between the transverse extensions and are positioned radially outward of the longitudinal members 196. The criss-cross overlapping configuration of the longitudinal members 196 and the lateral members 198 forms rectangular openings 200 that are sized appropriately for a particular application. For example, 0.0004 inches$^2$ is preferable to restrict small stones, rocks, and other debris from passing beyond the screen 26 and potentially damaging a downstream structure, such as a valve.

With regard to the materials of coupling 1, the pipe joint 2 and the fitting 6 may be made from a PVC material, which permits PVC cement to be used to connect the pipe joint 2 and the fitting 6 to PVC pipes or other components of the irrigation system. In one form, the collar 4 and the screen 26 are both manufactured using a polyethylene material. To provide a water tight seal, the o-rings 50, 58 may be made from a resilient material, such as Buna-N, nitrile, or urethane. Other materials may be used for the coupling 1, although they are preferably chosen to provide strength and impact resistance through a wide range of environmental conditions. In some applications, it may even be desirable to utilize steel or a metallic alloy for one or more components of the coupling 1.

Figure 10:
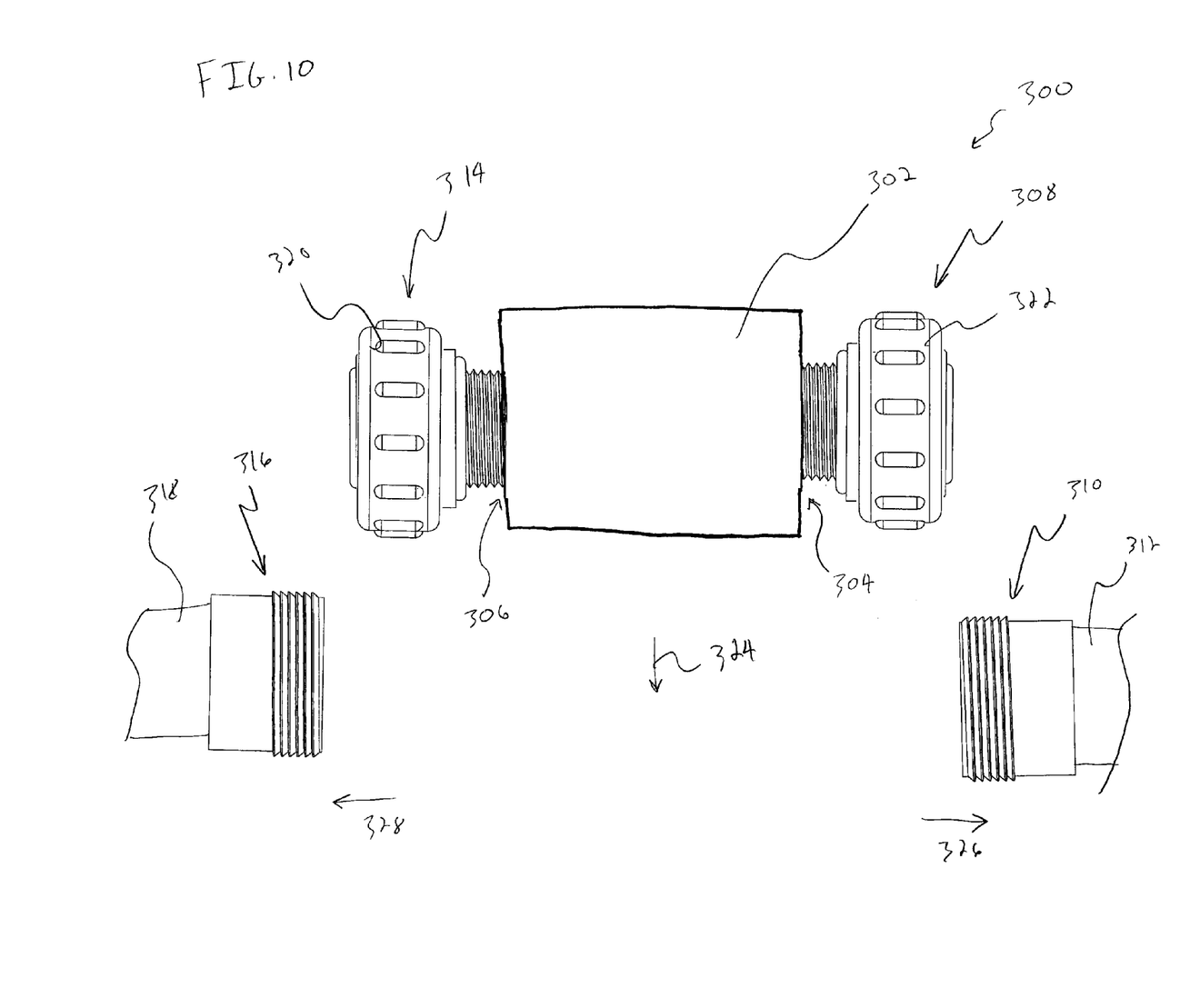
FIG. 10 is a side elevational view of an irrigation system subassembly which includes an irrigation system component and a pair of union couplings.

Turning to FIG. 10, an irrigation system subassembly 300 is shown. Irrigation system subassembly 300 includes an irrigation system component 302 having an upstream port 304 and a downstream port 306. The irrigation system component 302 may be a number of different types of components, including but not limited to a valve, a generator, or a filter. An upstream fitting 308 is connected to the upstream port 304, the fitting 308 being configured to connect to an upstream pipe joint 310 that is joined to an upstream pipe 312. Similarly, a downstream fitting 314 is connected to the downstream port 306, the downstream fitting 314 being configured to connect to a downstream pipe joint 316 that is joined to a downstream pipe 318. In one embodiment, the upstream fitting 308 has a screen (not shown) that is similar to the screen 26 discussed above, while the downstream fitting 314 does not have a screen.

By way of a pair of rotatable collars 320, 322, the irrigation system component 302 may be readily connected or disconnected to the pipes 312, 318. Specifically, the component 302 is lowered in direction 324 until the fittings 308, 314 are aligned with the respective pipe joints 312, 316. Next, the collars 320, 322 are shifted in directions 326, 328 toward the pipe joints 310, 316 before being threadingly engaged thereto. Conversely, removal of the component 302 is readily accomplished by threadingly disengaging the collars 320, 322 from the pipe joints 310, 316 and shifting the collars 320, 322 inward. The component 302 may be lifted upward and out of alignment with the pipes 312, 318. This configuration permits removal or installation of the component 302 without having to manipulate the pipes 312, 318, which is beneficial for installations where the pipes 312, 318 are fixed.

It will be understood that various changes in the details, materials, and arrangements of parts and components which have been herein described and illustrated in order to explain the nature of the union coupling with removable screen may be made by those skilled in the art within the principle and scope of the union coupling with removable screen as expressed in the appended claims. Furthermore, while various features have been described with regard to a particular embodiment or a particular approach, it will be appreciated that features described for one embodiment also may be incorporated with the other described embodiments.

What is claimed is:

1. A coupling comprising:
   a pipe joint;
   a collar;
   a fitting configured for attachment to the pipe joint by the collar and defining a through passage, an opening at one end leading into the passage, and at least one recess extending from the opening along at least a portion of the passage;
   a screen being removably disposed in at least a portion of the passage, the screen having a downstream portion and an upstream portion, the downstream portion having an outer surface portion that is at least substantially complimentary to the passage for engagement with the fitting at the passage, and the upstream portion having at least one transverse extension being received in the at least one recess to position the screen relative to the fitting in the passage;
   an open end of the at least one recess adjacent the fitting opening sized to permit the at least one screen transverse extension to be advanced in a downstream direction into the recess; and
   a closed end of the at least one recess configured to engage the screen transverse extension and restrict downstream movement of the screen along the fitting passage.

2. The coupling of claim 1 wherein the screen has a generally frusto-conical screen element tapering from the upstream portion to the downstream portion.

3. The coupling of claim 1 further comprising at least one stop extending from the fitting into the passage and engaging the downstream portion to position the screen relative to the fitting in the passage.

4. The coupling of claim 1 wherein the fitting comprises a body portion and a shoulder portion, the shoulder portion being attached to the body portion so as to define the opening.

5. The coupling of claim 1 wherein the at least one transverse extension extends along the screen from the upstream portion toward the downstream portion.

6. The coupling of claim 1 wherein the at least one transverse extension comprises a gripping portion for manually removing the screen from the passage.

7. A union coupling comprising:
   a pipe joint;
   a fitting having first and second ends with the first end configured to readily connect to and be disconnected from the pipe joint and a wall extending between the first and second ends, the fitting having a longitudinal axis extending between the first and second ends thereof;
   a passage being defined by the wall and extending between the ends of the fitting;
   a first outward flange extending from the wall intermediate the first and second ends of the fitting;
   a screen disposed at least in part in the passage;
   a collar having a flange portion that defines an opening, the opening being sized to pass over the wall at the first end of the fitting;
   a second outward flange being connected to the first end of the fitting, the second outward flange defining an opening aligned with the passage that is sized to permit the screen to be inserted at least in part into and removed from the passage;
   the second outward flange extends outward from the wall of the fitting with the second outward flange connected to the first end of the fitting such that the first and second outward flanges both extend from the wall of the fitting beyond the flange portion of the collar to captivate the collar on the fitting when the fitting is disconnected from the pipe joint; and
   a support member of the screen extends transverse to the fitting longitudinal axis and outwardly beyond the opening of the second flange with the screen inserted in the fitting passage such that the support member is captured between the second flange and the pipe joint when the fitting is connected to the pipe joint.

8. The union coupling of claim 7 further comprising a seal disposed between the second outward flange and the pipe joint.

9. The union coupling of claim 8 wherein the collar includes threads that mate with complimentary threading on the pipe joint to connect the fitting and the pipe joint together and compress the seal between the second outward flange and the pipe joint.

10. The union coupling of claim 7 wherein the screen has a downstream end with a continuous rim, the rim being flush against the wall of the fitting with the downstream end of the screen disposed in the passage.

11. The union coupling of claim 10 wherein the fitting includes a stop flange extending from the wall of the fitting into the passage and the rim of the screen engages the stop flange.

12. The union coupling of claim 7 wherein the second outward flange is spin welded to the fitting.

13. A union coupling comprising:
a pipe joint defining a first passage;
a collar;
a fitting configured to be connected to the pipe joint by the collar;
an inner surface of the fitting defining a second passage, the first and second passages being aligned with the fitting connected to the pipe joint;
at least one recessed support of the fitting that extends transversely to the length of the fitting and outwardly from the inner surface thereof;
at least one stop of the fitting that extends inwardly from the inner surface and is spaced from the at least one recessed support along the length of the fitting;
a screen configured to be received at least in part within the fitting;
an upstream portion of the screen having at least one transverse extension that seats against the recessed support;
a downstream portion of the screen having a rim that rests against the at least one stop of the fitting with the screen received within the fitting such that the at least one recessed support and stop resist movement of the screen beyond a predetermined position within the fitting; and
stop surfaces of the at least one recessed support and the at least one stop of the fitting that face upstream and restrict movement of the at least one transverse extension and the rim of the screen beyond the at least one recessed support and the at least one stop.

14. The union coupling of claim 13 wherein the rim of the screen has an outer surface portion that is flush with the inner surface of the fitting with the screen received within the fitting.

15. The union coupling of claim 13 wherein the pipe joint has a sealing portion that abuts the fitting with the fitting connected to the pipe joint such that the transverse extension of the screen is captured between the at least one recessed support of the fitting and the sealing portion of the pipe joint.

16. The union coupling of claim 13 wherein the fitting comprises a body portion and a shoulder portion, the shoulder portion being connected to the body portion and having an innermost surface that defines a passage through the shoulder portion with the at least one recessed support formed in the innermost surface of the shoulder portion.

17. The union coupling of claim 16 further comprising:
an inward flange portion of the collar that defines an opening sized to pass over an end of the body portion;
a first outward flange portion extending from the body portion; and
a second outward flange portion extending from the shoulder portion, the first and second flange portions captivating the collar on the fitting.

18. A union coupling comprising:
a pipe joint having a through opening;
a fitting having first and second ends with the first end configured to readily connect to and be disconnected from the pipe joint and a wall extending between the first and second ends, the fitting having a longitudinal axis extending between the first and second ends;
a passage being defined by the wall and extending between the ends of the fitting;
a first outward flange extending from the wall intermediate the first and second ends of the fitting;
a collar having an inward flange portion that defines an opening, the opening being sized to pass over the wall at the first end of the fitting;
a shoulder element being connected to the first end of the fitting and having an opening that opens to the passage of the fitting with the shoulder element connected to the fitting, the shoulder element having a second outward flange that is sized to restrict the inward flange portion of the collar from passing beyond the second outward flange;
the first outward flange is sized to restrict the inward flange portion of the collar from passing beyond the first outward flange such that the outward flanges of the fitting and the shoulder element captivate the collar on the fitting when the fitting is disconnected from the pipe joint; and
confronting surfaces of the pipe joint and shoulder element that extend outward from the openings thereof generally perpendicular to the longitudinal axis of the fitting, the confronting surfaces of the pipe joint and shoulder element configured to engage and inhibit relative movement of the pipe joint and shoulder element.

19. The union coupling of claim 18 wherein the first end of the fitting has at least one annular lip extending toward the shoulder element, and the shoulder element has at least one complimentary annular lip extending toward the first end of the fitting and generally aligned with the at least one annular lip of the fitting.

20. The union coupling of claim 18 wherein the connection between the first end of the fitting and the shoulder element defines at least one annular pocket that extends around the wall of the fitting.

21. The union coupling of claim 18 wherein the shoulder element is connected to the first end of the fitting via a spin weld.

\* \* \* \* \*